(12) United States Patent
Hsieh (10) Patent No.: US 8,472,755 B2
(45) Date of Patent: Jun. 25, 2013

(54) METHOD FOR GENERATING A HIGH QUALITY UP-SCALED IMAGE, AND ASSOCIATED DEVICE

(75) Inventor: Chao-Kuei Hsieh, Taipei County (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 366 days.

(21) Appl. No.: 12/881,161

(22) Filed: Sep. 13, 2010

(65) Prior Publication Data
US 2011/0274371 A1  Nov. 10, 2011

(30) Foreign Application Priority Data
May 7, 2010  (TW) .............................. 99114657 A (51) Int. Cl.
*G06K 9/32* (2006.01)
(52) U.S. Cl.
USPC .............................................. 382/299
(58) Field of Classification Search
USPC ...... 315/368.13; 318/573; 345/606; 348/538, 348/E7.012; 358/525; 381/94.4; 382/299, 382/300; 386/271, 272; 700/189, 252; 704/265; 708/290, 313, 847
See application file for complete search history.

(56) References Cited

U.S. PATENT DOCUMENTS
2008/0069203 A1* 3/2008 Karczewicz et al. .... 375/240.01

FOREIGN PATENT DOCUMENTS
CN  1537384 A  10/2004

* cited by examiner

*Primary Examiner* — Gregory F Cunningham
(74) *Attorney, Agent, or Firm* — Winston Hsu; Scott Margo (57) ABSTRACT

A method for generating a high quality up-scaled image includes: utilizing at least four pixels within a source image as reference pixels within the high quality up-scaled image, where the reference pixels are utilized as a portion of pixels within the high quality up-scaled image, and are utilized as reference for generating another portion of pixels within the high quality up-scaled image; and calculating at least one portion of three linear distribution values corresponding to three quarter points between two adjacent pixels of the reference pixels according to pixel values of the two adjacent pixels and adjusting the portion of the linear distribution values according to pixel values of at least three reference pixels of the four reference pixels, and generating at least one pixel within the high quality up-scaled image accordingly. An associated device is also provided.

13 Claims, 6 Drawing Sheets

METHOD FOR GENERATING A HIGH QUALITY UP-SCALED IMAGE, AND ASSOCIATED DEVICE

BACKGROUND OF THE INVENTION

1. Field of the Invention

The present invention relates to image processing, and more particularly, to a method for generating a high quality up-scaled image, and to an associated device.

2. Description of the Prior Art

According to the related art, a conventional video playback device can perform an up-scaling operation on an original image to generate a high resolution image, and more particularly, an image having a resolution that is higher than the original resolution (i.e. the resolution of the original image). Typically, when generating a new pixel in the horizontal direction, the conventional video playback device only utilize the original pixels at the left and right sides of the new pixel as reference pixels. As a result, regarding some image contents of the original image, the high resolution image generated by the conventional video playback device looks unreal since the original image inherently does not include complete image information required for generating the high resolution image.

When the conventional video playback device generates the high resolution image, a problem of generating a great amount of erroneous image information may occur. There are some solutions proposed by the related art in response to this problem, for trying to improve the image quality. However, no matter which solution is chosen, a corresponding side effect typically exists. For example, utilizing a complicated algorithm may cause hardware resources to be insufficient. In another example, utilizing a hardware circuit equipped with increased calculation capability may cause the overall cost to be too high. Therefore, a novel method is required for improving the quality of the high resolution image.

SUMMARY OF THE INVENTION

It is therefore an objective of the claimed invention to provide a method for generating a high quality up-scaled image, and to provide an associated device, in order to solve the above-mentioned problem.

According to a preferred embodiment of the claimed invention, a method for generating a high quality up-scaled image comprises: utilizing at least four pixels within a source image as a plurality of reference pixels within the high quality up-scaled image, wherein the reference pixels are utilized as a portion of pixels within the high quality up-scaled image, and are utilized as reference for generating another portion of pixels within the high quality up-scaled image; and calculating at least one portion of three linear distribution values corresponding to three quarter points between two adjacent pixels of the reference pixels according to pixel values of the two adjacent pixels and adjusting the portion of the linear distribution values according to pixel values of at least three reference pixels of the plurality of reference pixels, and generating at least one pixel within the high quality up-scaled image accordingly.

While the method mentioned above is disclosed, an associated device for generating a high quality up-scaled image is further provided. The device comprises a controller arranged to execute a program code to control operations of the device, and comprises a read only memory (ROM) positioned within/outside the controller, wherein the ROM is arranged to store the program code. The controller executing the program code utilizes at least four pixels within a source image as a plurality of reference pixels within the high quality up-scaled image, wherein the reference pixels are utilized as a portion of pixels within the high quality up-scaled image, and are utilized as reference for generating another portion of pixels within the high quality up-scaled image. In addition, the controller executing the program code calculates at least one portion of three linear distribution values corresponding to three quarter points between two adjacent pixels of the reference pixels according to pixel values of the two adjacent pixels and adjusts the portion of the linear distribution values according to pixel values of at least three reference pixels of the plurality of reference pixels, and generates at least one pixel within the high quality up-scaled image accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
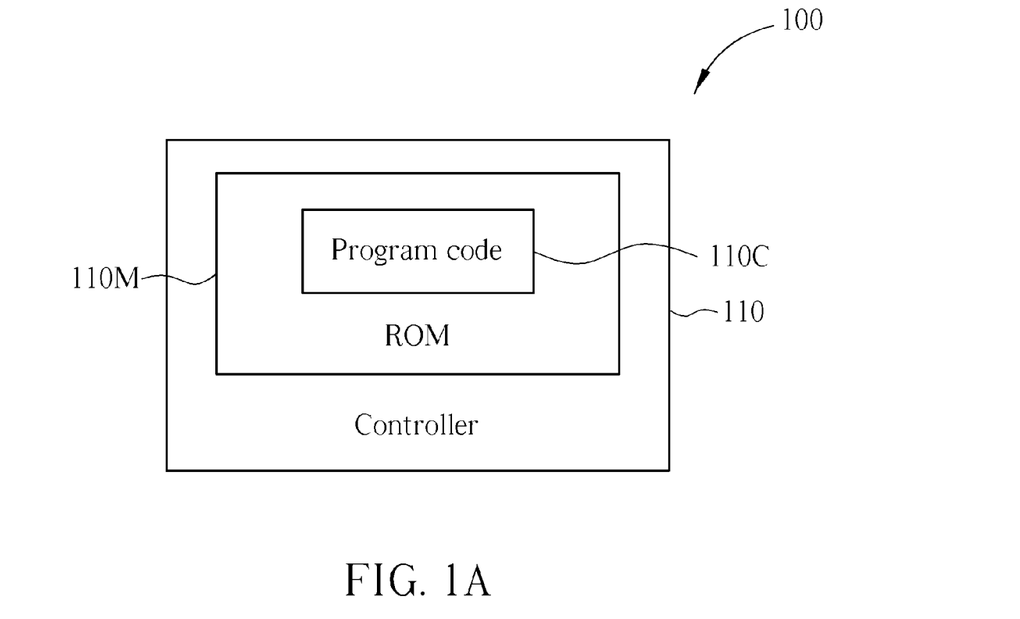
FIG. 1A is a diagram of a device for generating a high quality up-scaled image according to a first embodiment of the present invention.

Please refer to FIG. 1A, which illustrates a diagram of a device 100 for generating a high quality up-scaled image $I_{US}$ according to a first embodiment of the present invention. The device 100 comprises a controller such as the controller 110, and further comprises a read only memory (ROM) 110M, where the ROM 110M is positioned within the controller 110. The controller 110 is arranged to execute a program code 110C to control operations of the device 100, and the ROM 110M is arranged to store the program code 110C. In practice, the ROM 110M can be an Electrically Erasable Programmable ROM (EEPROM). This is for illustrative purposes only, and is not meant to be a limitation of the present invention. According to some variations of this embodiment, the ROM 110M can be other types of ROMs, respectively.

According to this embodiment, the aforementioned controller utilizes at least four pixels within a source image $I_S$ as a plurality of reference pixels within the high quality up-scaled image $I_{US}$, where the reference pixels are utilized as a portion of pixels within the high quality up-scaled image $I_{US}$, and are utilized as reference for generating another portion of pixels within the high quality up-scaled image $I_{US}$. In addition, the aforementioned controller calculates at least one portion of three linear distribution values corresponding to three quarter points between two adjacent pixels of the reference pixels according to pixel values of the two adjacent pixels and adjusts the portion of the linear distribution values according to pixel values of at least three reference pixels of the plurality of reference pixels, and generates at least one pixel within the high quality up-scaled image $I_{US}$ accordingly.

Figure 1B:
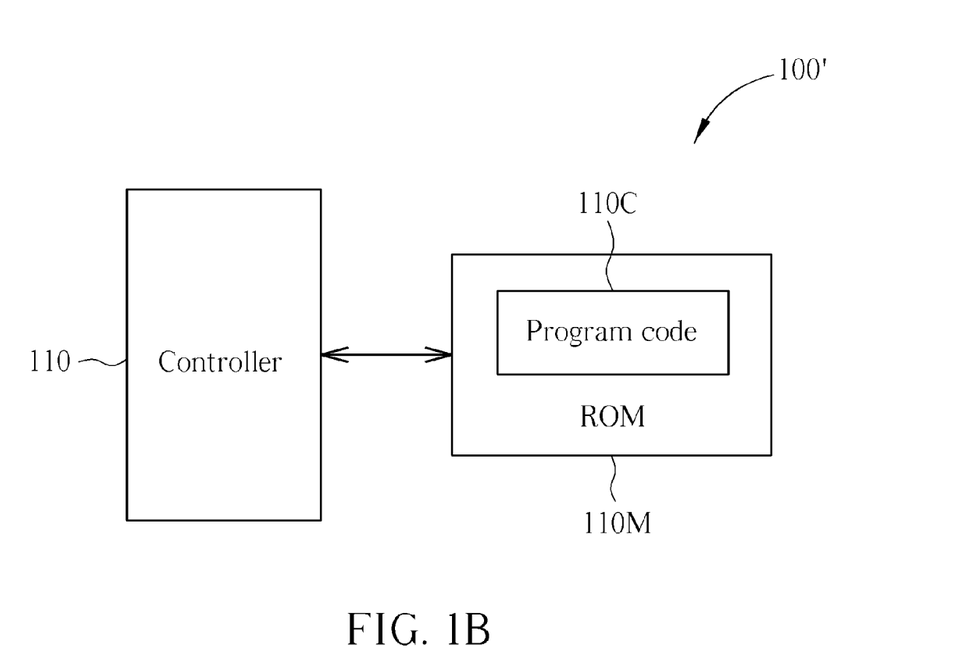
FIG. 1B illustrates a variation of the first embodiment.

Please note that the ROM 110M of this embodiment is positioned within the controller 110. This is for illustrative purposes only, and is not meant to be a limitation of the present invention. According to a variation of this embodiment, such as that shown in FIG. 1B, the ROM 110M can be positioned outside the controller. In response to the change in architecture, the numeral 100 is replaced by the numeral 100' in this variation, where the device 100' comprises the controller 110 and the ROM 110M.

Figure 2:
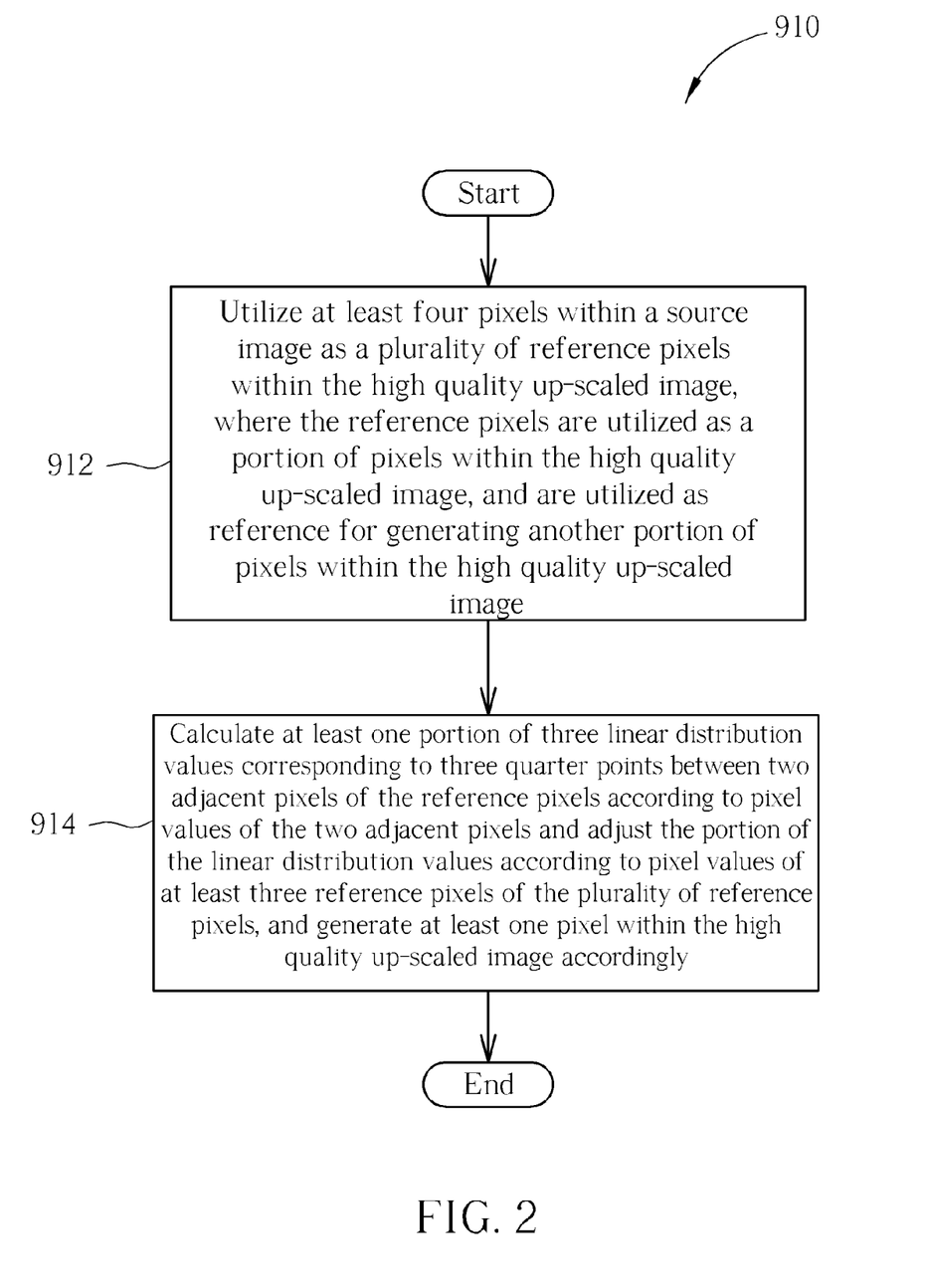
FIG. 2 is a flowchart of a method for generating a high quality up-scaled image according to an embodiment of the present invention.

FIG. 2 is a flowchart of a method 910 for generating a high quality up-scaled image such as the aforementioned high quality up-scaled image $I_{US}$ according to an embodiment of the present invention. The method can be applied to any of the device 100 shown in FIG. 1A and the device 100' shown in FIG. 1B, and more particularly, to the aforementioned controller (e.g. the controller 110 executing the program code 110C). In addition, the method can be implemented by utilizing any of the device 100 shown in FIG. 1A and the device 100' shown in FIG. 1B, and more particularly, by utilizing the controller mentioned above. The method 910 is described as follows.

Step 912: The aforementioned controller utilizes at least four pixels within a source image such as the source image $I_S$ mentioned above (e.g. the pixels $P_{n-1}$, $P_n$, $P_{n+1}$, and $P_{n+2}$) as a plurality of reference pixels within the high quality up-scaled image $I_{US}$, where the reference pixels are utilized as a portion of pixels within the high quality up-scaled image $I_{US}$, and are utilized as reference for generating another portion of pixels within the high quality up-scaled image $I_{US}$. In this embodiment, the four pixels are arranged on the same line, and more particularly, are the pixels $P_{n-1}$, $P_n$, $P_{n+1}$, and $P_{n+2}$ arranged on the line. According to a special case of this embodiment, the four pixels are four contiguous pixels horizontally arranged within the source image $I_S$. According to another special case of this embodiment, the four pixels are four contiguous pixels vertically arranged within the source image $I_S$. According to another special case of this embodiment, it is unnecessary that the line is a horizontal line or a vertical line.

Step 914: The aforementioned controller calculates at least one portion of three linear distribution values corresponding to three quarter points between two adjacent pixels of the reference pixels (e.g. a portion or all of the three linear distribution values) according to pixel values of the two adjacent pixels and adjusts the portion of the linear distribution values according to pixel values of at least three reference pixels of the plurality of reference pixels, and generates at least one pixel within the high quality up-scaled image $I_{US}$ accordingly. More particularly, the two adjacent pixels are two pixels centrally located within the four pixels, such as the two pixels $P_n$ and $P_{n+1}$ that are centrally located within the four pixels $P_{n-1}$, $P_n$, $P_{n+1}$, and $P_{n+2}$. For example, in a situation where the line is a horizontal line or a vertical line, the linear distribution values can be linear interpolation values based upon the pixel values of the two adjacent pixels. In addition, in a situation where the line is neither a horizontal line nor a vertical line, the linear distribution values can be bilinear values based upon the pixel values of the two adjacent pixels. Thus, with regard to at least one portion of the three quarter points (e.g. a portion or all of the three quarter points), the controller can perform bilinear calculations according to the pixel values of the two adjacent pixels.

According to this embodiment, in a situation where the two adjacent pixels are the pixels $P_n$ and $P_{n+1}$, the three quarter points mentioned above can be referred to as the quarter points $P_{n+0.25}$, $P_{n+0.5}$, and $P_{n+0.75}$. The controller (e.g. the controller 110 executing the program code 110C) can utilize adjusted linear distribution value(s) of the portion of the linear distribution values (e.g. one or more adjusted linear distribution values) as at least one pixel value of the at least one pixel mentioned in Step 914, where the quarter points $P_{n+0.25}$, $P_{n+0.5}$, and/or $P_{n+0.75}$ can be pixels within the high quality up-scaled image $I_{US}$. More particularly, the portion of the linear distribution values comprises all of the linear distribution values, and the quarter points $P_{n+0.25}$, $P_{n+0.5}$, and $P_{n+0.75}$ are pixels within the high quality up-scaled image $I_{US}$. Thus, the controller can utilize the adjusted linear distribution values of all of the linear distribution values as pixel values of the corresponding pixels within the high quality up-scaled image $I_{US}$. This is for illustrative purposes only, and is not meant to be a limitation of the present invention. According to a variation of this embodiment, the controller can perform at least one interpolation calculation according to the adjusted linear distribution value(s) of the portion of the linear distribution values, in order to generate the at least one pixel value of the at least one pixel mentioned in Step 914, where the quarter points $P_{n+0.25}$, $P_{n+0.5}$, and $P_{n+0.75}$ are not pixels within the high quality up-scaled image $I_{US}$.

FIGS. 3-6 respectively illustrate some implementation details of the method 910 shown in FIG. 2 according different embodiments of the present invention, where the horizontal axis and the vertical axis in the upper half of each of FIGS. 3-6 respectively represent pixel locations and pixel values, and the lower half of each of FIGS. 3-6 illustrates relative locations of the reference pixels $P_{n-1}$, $P_n$, $P_{n+1}$, and $P_{n+2}$ and relative locations of the three quarter points $P_{n+0.25}$, $P_{n+0.5}$, and $P_{n+0.75}$ between the two adjacent pixels $P_n$ and $P_{n+1}$. In these embodiments, the notations $V(P_{n-1})$, $V(P_n)$, $V(P_{n+1})$, and $V(P_{n+2})$ are utilized for representing the pixel values of the reference pixels $P_{n-1}$, $P_n$, $P_{n+1}$, and $P_{n+2}$, respectively. In addition, for better comprehension, the aforementioned "all of the linear distribution values" is taken as an example of the at least one portion of the linear distribution values mentioned in Step 914. This is for illustrative purposes only, and is not meant to be a limitation of the present invention. According to some variations of these embodiments respectively shown in FIGS. 3-6, however, it is unnecessary that the at least one portion of the linear distribution values mentioned in Step 914 comprises all of the linear distribution values.

Figure 3:
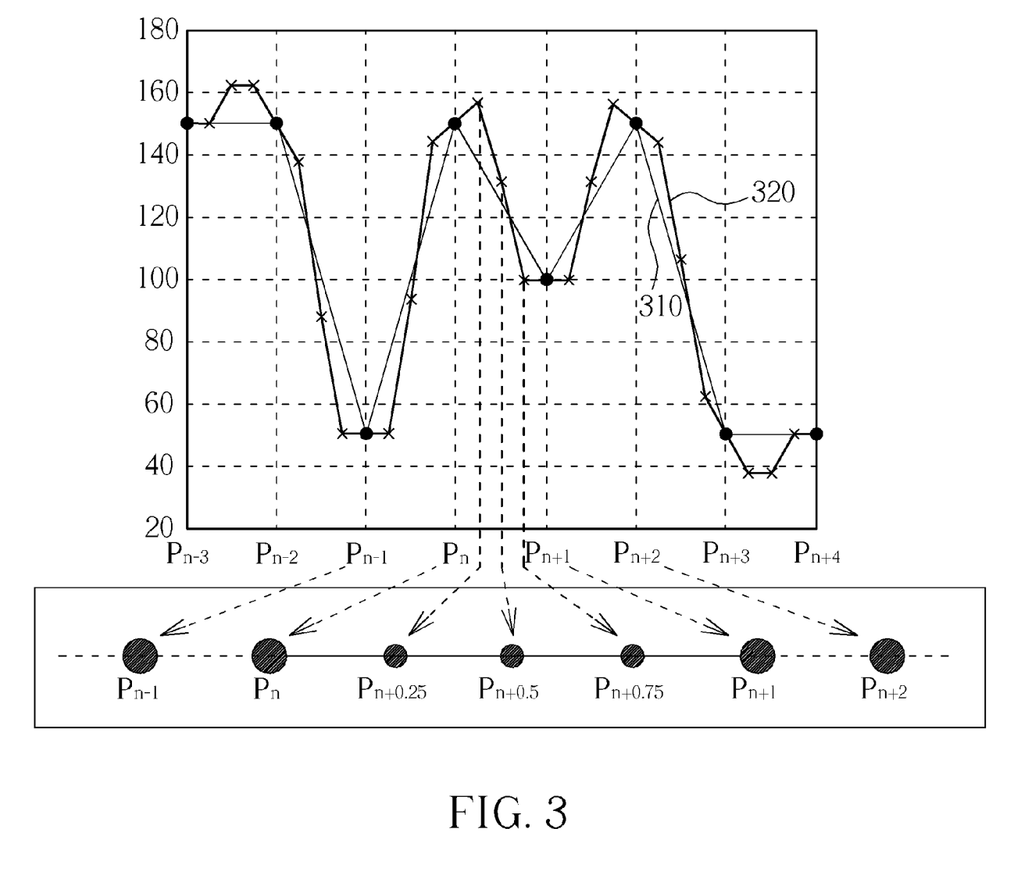
FIGS. 3-6 respectively illustrate some implementation details of the method shown in FIG. 2 according different embodiments of the present invention.

Referring to FIG. 3, the controller calculates the three linear distribution values corresponding to the three quarter points $P_{n+0.25}$, $P_{n+0.5}$, and $P_{n+0.75}$, such as the linear distribution values $V_1(P_{n+0.25})$, $V_1(P_{n+0.5})$, and $V_1(P_{n+0.75})$ respectively corresponding to the quarter points $P_{n+0.25}$, $P_{n+0.5}$, and $P_{n+0.75}$ on the curve 320, according to the pixel values $V(P_n)$ and $V(P_{n+1})$, and adjusts the linear distribution values $V_1(P_{n+0.25})$, $V_1(P_{n+0.5})$, and $V_1(P_{n+0.75})$ according to at least three pixel values of the pixel values $V(P_{n-1})$, $V(P_n)$, $V(P_{n+1})$, and $V(P_{n+2})$ (e.g. three contiguous pixel values within the pixel values $V(P_{n-1})$, $V(P_n)$, $V(P_{n+1})$, and $V(P_{n+2})$, or all of the pixel values $V(P_{n-1})$, $V(P_n)$, $V(P_{n+1})$, and $V(P_{n+2})$) to generate the values respectively corresponding to the quarter points $P_{n+0.25}$, $P_{n+0.5}$, and $P_{n+0.75}$ on the curve 320, such as the values $V_{2,1}(P_{n+0.25})$, $V_{2,1}(P_{n+0.5})$, and $V_{2,1}(P_{n+0.75})$, and generates at least one pixel within the high quality up-scaled image $I_{US}$ accordingly.

In this embodiment, the controller can utilize linear combinations of at least three pixel values of the pixel values $V(P_{n-1})$, $V(P_n)$, $V(P_{n+1})$, and $V(P_{n+2})$ as adjustment amounts utilized during adjusting the linear distribution values $V_1(P_{n+0.25})$, $V_1(P_{n+0.5})$, and $V_1(P_{n+0.75})$, respectively, such as the adjustment amounts $D_{2,1}(P_{n+0.25})$, $D_{2,1}(P_{n+0.5})$, and $D_{2,1}(P_{n+0.75})$, which can be expressed as follows:

$$D_{2,1}(P_{n+0.25})=V_{2,1}(P_{n+0.25})-V_1(P_{n+0.25});$$

$$D_{2,1}(P_{n+0.5})=V_{2,1}(P_{n+0.5})-V_1(P_{n+0.5}); \text{ and}$$

$$D_{2,1}(P_{n+0.75})=V_{2,1}(P_{n+0.75})-V_1(P_{n+0.75}).$$

More particularly, the controller utilizes the linear combinations of the pixel values $V(P_{n-1})$, $V(P_n)$, and $V(P_{n+1})$ as the adjustment amount $D_{2,1}(P_{n+0.25})$, and utilizes the linear combinations of the pixel values $V(P_{n-1})$, $V(P_n)$, $V(P_{n+1})$, and $V(P_{n+2})$ as the adjustment amount $D_{2,1}(P_{n+0.5})$, and further utilizes the linear combinations of the pixel values $V(P_n)$, $V(P_{n+1})$, and $V(P_{n+2})$ as the adjustment amount $D_{2,1}(P_{n+0.75})$, where these adjustment amounts can be expressed as follows:

$$D_{2,1}(P_{n+0.25})=a_{0.25,n-1}*V(P_{n-1})+a_{0.25,n}*V(P_n)+a_{0.25,n+1}*V(P_{n+1});$$

$$D_{2,1}(P_{n+0.5})=a_{0.5,n-1}*V(P_{n-1})+a_{0.5,n}*V(P_n)+a_{0.5,n+1}*V(P_{n+1})+a_{0.5,n+2}*V(P_{n+2}); \text{ and}$$

$$D_{2,1}(P_{n+0.75})=a_{0.75,n}*V(P_n)+a_{0.75,n+1}*V(P_{n+1})+a_{0.75,n+2}*V(P_{n+2});$$

where the notations $\{a_{0.25,\,n-1},\,a_{0.25,\,n},\,a_{0.25,\,n+1}\}$, $\{a_{0.5,\,n-1},\,a_{0.5,\,n},\,a_{0.5,\,n+1},\,a_{0.5,\,n+2}\}$, and $\{a_{0.75,\,n},\,a_{0.75,\,n+1},\,a_{0.75,\,n+2}\}$ represent linear combination coefficients. In this embodiment, the absolute value of any of at least a portion of these linear combination coefficients (e.g. a portion or all of these linear combination coefficients) can be $2^{-m}$ such as ½, ¼, ⅛, . . . , etc., where m represents a positive integer. Thus, by performing bit shifting operations on the pixel values $V(P_{n-1})$, $V(P_n)$, $V(P_{n+1})$, and/or $V(P_{n+2})$, the controller can easily calculate these linear combinations. Based upon the architecture disclosed above, when generating the high quality up-scaled image $I_{US}$, the present invention method and device can achieve the goal of giving consideration to both the image quality and the calculation speed.

According to a special case of this embodiment, the controller can utilize the adjustment results illustrated by the curve 320, such as the values $V_{2,1}(P_{n+0.25})$, $V_{2,1}(P_{n+0.5})$, and $V_{2,1}(P_{n+0.75})$, as the pixel values $V(P_{n+0.25})$, $V(P_{n+0.5})$, and $V(P_{n+0.75})$ on the quarter points $P_{n+0.25}$, $P_{n+0.5}$, and $P_{n+0.75}$, respectively.

Please note that, no matter whether the quarter points $P_{n+0.25}$, $P_{n+0.5}$, and/or $P_{n+0.75}$ are pixels within the high quality up-scaled image $I_{US}$, the controller can perform interpolation calculations according to the pixel values $V(P_n)$ and $V(P_{n+1})$ and according to two values corresponding to adjacent locations on the line within the values $V_{2,1}(P_{n+0.25})$, $V_{2,1}(P_{n+0.5})$, and $V_{2,1}(P_{n+0.75})$, in order to generate pixel values of pixels of other locations.

Figure 4:
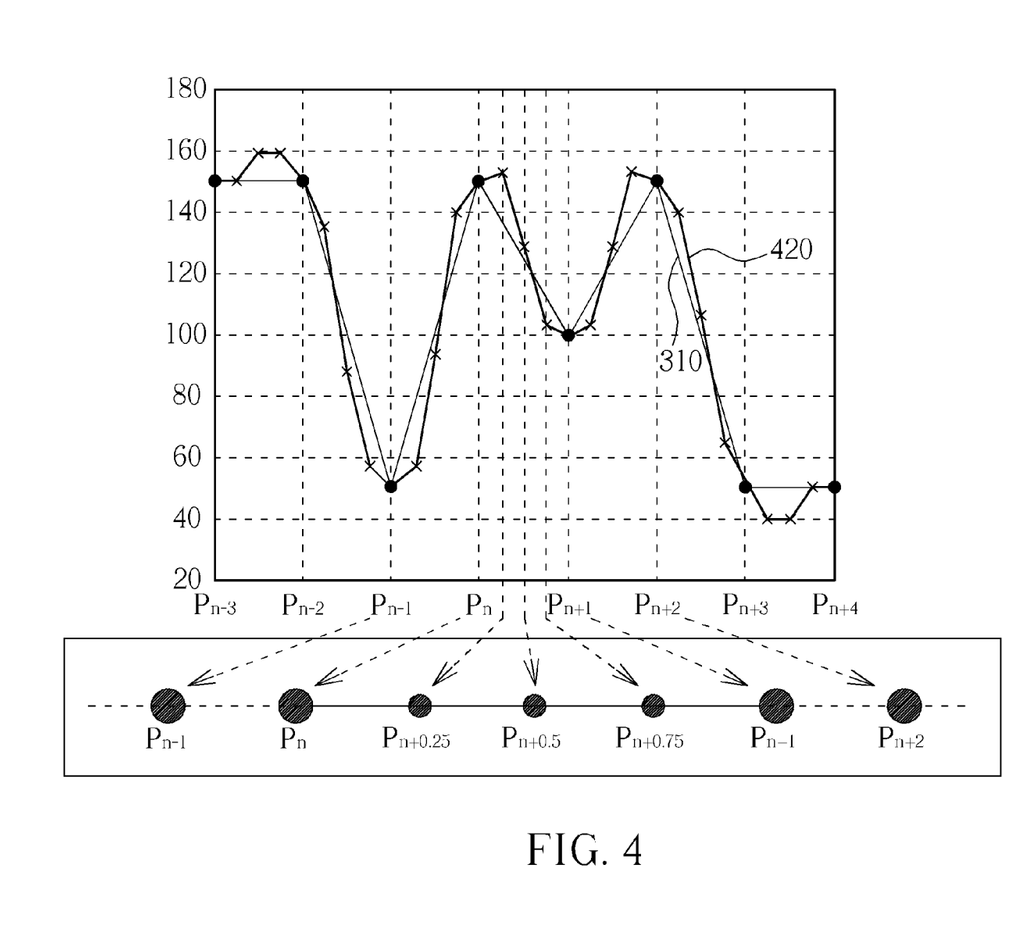

Referring to FIG. 4, the controller calculates the linear distribution values $V_1(P_{n+0.25})$, $V_1(P_{n+0.5})$, and $V_1(P_{n+0.75})$ according to the pixel values $V(P_n)$ and $V(P_{n+1})$, and adjusts the linear distribution values $V_1(P_{n+0.25})$, $V_1(P_{n+0.5})$, and $V_1(P_{n+0.75})$ according to at least three pixel values of the pixel values $V(P_{n-1})$, $V(P_n)$, $V(P_{n+1})$, and $V(P_{n+2})$ to generate the values respectively corresponding to the quarter points $P_{n+0.25}$, $P_{n+0.5}$, and $P_{n+0.75}$ on the curve 420, such as the values $V_{2,2}(P_{n+0.25})$, $V_{2,2}(P_{n+0.5})$, and $V_{2,2}(P_{n+0.75})$, and generates at least one pixel within the high quality up-scaled image $I_{US}$ accordingly. In this embodiment, the adjustment amounts utilized during adjusting the linear distribution values $V_1(P_{n+0.25})$, $V_1(P_{n+0.5})$, and $V_1(P_{n+0.75})$, respectively, such as the adjustment amounts $D_{2,2}(P_{n+0.25})$, $D_{2,2}(P_{n+0.5})$, and $D_{2,2}(P_{n+0.75})$, can be expressed as follows:

$$D_{2,2}(P_{n+0.25})=V_{2,2}(P_{n+0.25})-V_1(P_{n+0.25});$$

$$D_{2,2}(P_{n+0.5})=V_{2,2}(P_{n+0.5})-V_1(P_{n+0.5}); \text{ and}$$

$$D_{2,2}(P_{n+0.75})=V_{2,2}(P_{n+0.75})-V_1(P_{n+0.75}).$$

The controller 110 executing the program code 110C applies a weighting parameter $W_2$ to at least one expected adjustment amount such as the adjustment amounts $D_{2,1}(P_{n+0.25})$, $D_{2,1}(P_{n+0.5})$, and $D_{2,1}(P_{n+0.75})$ of the embodiment shown in FIG. 3, to generate at least one adjustment amount such as the adjustment amounts $D_{2,2}(P_{n+0.25})$, $D_{2,2}(P_{n+0.5})$, and $D_{2,2}(P_{n+0.75})$, which can be expressed as follows:

$$D_{2,2}(P_{n+0.25})=W_2*D_{2,1}(P_{n+0.25});$$

$$D_{2,2}(P_{n+0.5})=W_2*D_{2,1}(P_{n+0.5}), \text{ and}$$

$$D_{2,2}(P_{n+0.75})=W_2*D_{2,1}(P_{n+0.75}).$$

For example, FIG. 4 illustrates a situation where $W_2=0.75$.

According to a special case of this embodiment, the controller can utilize the adjustment results illustrated by the curve 420, such as the values $V_{2,2}(P_{n+0.25})$, $V_{2,2}(P_{n+0.5})$, and $V_{2,2}(P_{n+0.75})$, as the pixel values $V(P_{n+0.25})$, $V(P_{n+0.5})$, and $V(P_{n+0.75})$ on the quarter points $P_{n+0.25}$, $P_{n+0.5}$, and $P_{n+0.75}$, respectively.

Please note that, no matter whether the quarter points $P_{n+0.25}$, $P_{n+0.5}$, and/or $P_{n+0.75}$ are pixels within the high quality up-scaled image $I_{US}$, the controller can perform interpolation calculations according to the pixel values $V(P_n)$ and $V(P_{n+1})$ and according to two values corresponding to adjacent locations on the line within the values $V_{2,2}(P_{n+0.25})$, $V_{2,2}(P_{n+0.5})$, and $V_{2,2}(P_{n+0.75})$, in order to generate pixel values of pixels of other locations.

Figure 5:
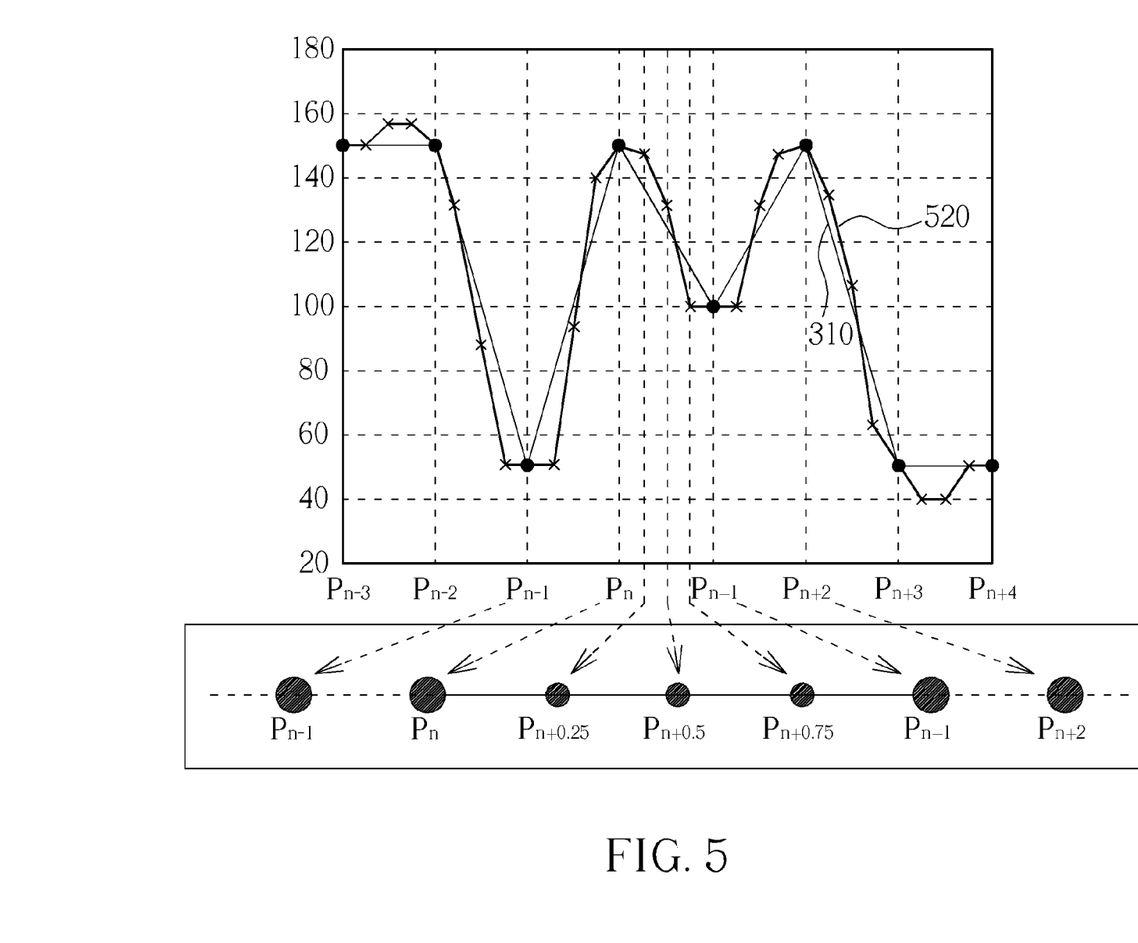

Referring to FIG. 5, the controller calculates the linear distribution values $V_1(P_{n+0.25})$, $V_1(P_{n+0.5})$, and $V_1(P_{n+0.75})$ according to the pixel values $V(P_n)$ and $V(P_{n+1})$, and adjusts the linear distribution values $V_1(P_{n+0.25})$, $V_1(P_{n+0.5})$, and $V_1(P_{n+0.75})$ according to at least three pixel values of the pixel values $V(P_{n-1})$, $V(P_n)$, $V(P_{n+1})$, and $V(P_{n+2})$ to generate the values respectively corresponding to the quarter points $P_{n+0.25}$, $P_{n+0.5}$, and $P_{n+0.75}$ on the curve 520, such as the values $V_{2,3}(P_{n+0.25})$, $V_{2,3}(P_{n+0.5})$, and $V_{2,3}(P_{n+0.75})$, and generates at least one pixel within the high quality up-scaled image $I_{US}$ accordingly. In this embodiment, the adjustment amounts utilized during adjusting the linear distribution values $V_1(P_{n+0.25})$, $V_1(P_{n+0.5})$, and $V_1(P_{n+0.75})$, respectively, such as the adjustment amounts $D_{2,3}(P_{n+0.25})$, $D_{2,3}(P_{n+0.5})$, and $D_{2,3}(P_{n+0.75})$, can be expressed as follows:

$$D_{2,3}(P_{n+0.25})=V_{2,3}(P_{n+0.25})-V_1(P_{n+0.25});$$

$$D_{2,3}(P_{n+0.5})=V_{2,3}(P_{n+0.5})-V_1(P_{n+0.5}); \text{ and}$$

$$D_{2,3}(P_{n+0.75})=V_{2,3}(P_{n+0.75})-V_1(P_{n+0.75}).$$

According to whether at least one expected adjustment result that is obtained from adjusting the portion of the linear distribution values by at least one corresponding expected adjustment amount (e.g. the adjustment amounts $D_{2,1}(P_{n+0.25})$, $D_{2,1}(P_{n+0.5})$, and/or $D_{2,1}(P_{n+0.75})$ of the embodiment shown in FIG. 3) falls within at least one predetermined range, the controller 110 executing the program code 110C determines whether to apply at least one weighting parameter such as the weighting parameter $W_3$ to the aforementioned at least one corresponding expected adjustment amount to generate at least one adjustment amount utilized during adjusting the portion of the linear distribution values. More particularly, in a situation where the aforementioned at least one expected adjustment result falls within the aforementioned at least one predetermined range, the controller 110 executing the program code 110C applies the aforementioned at least one weighting parameter such as the weighting parameter $W_3$ to the at least one corresponding expected adjustment amount to generate the at least one adjustment amount. For example, given that the expected adjustment results that are obtained from adjusting the linear distribution values $V_1(P_{n+0.25})$, $V_1(P_{n+0.5})$, and $V_1(P_{n+0.75})$ by the corresponding expected adjustment amounts $D_{2,1}(P_{n+0.25})$, $D_{2,1}(P_{n+0.5})$, and $D_{2,1}(P_{n+0.75})$ are the values $V_{2,1}(P_{n+0.25})$, $V_{2,1}(P_{n+0.5})$ and $V_{2,1}(P_{n+0.75})$, respectively, in a situation where the predetermined range represents the interval [101, 255], as the values $V_{2,1}(P_{n+0.25})$ and $V_{2,1}(P_{n+0.5})$ falls within the predetermined range, the controller 110 applies the weighting parameter $W_3$ to the expected adjustment amounts $D_{2,1}(P_{n+0.25})$ and $D_{2,1}(P_{n+0.5})$ to generate the adjustment amounts $D_{2,3}(P_{n+0.25})$ and $D_{2,3}(P_{n+0.5})$, respectively. In addition, as the value $V_{2,1}(P_{n+0.75})$ does not fall within the predetermined range, the controller 110 does not apply the weighting parameter $W_3$ to the expected adjustment amount $D_{2,1}(P_{n+0.75})$. Thus, in this embodiment, the adjustment amounts $D_{2,3}(P_{n+0.25})$, $D_{2,3}(P_{n+0.5})$, and $D_{2,3}(P_{n+0.75})$ in the above situation can be expressed as follows:

$$D_{2,3}(P_{n+0.25})=W_3*D_{2,1}(P_{n+0.25});$$

$$D_{2,3}(P_{n+0.5})=W_3*D_{2,1}(P_{n+0.5}); \text{ and}$$

$$D_{2,3}(P_{n+0.75})=D_{2,1}(P_{n+0.75}).$$

For example, FIG. 5 illustrates a situation where $W_3=0.5$.

According to a special case of this embodiment, the controller can utilize the adjustment results illustrated by the curve 520, such as the values $V_{2,3}(P_{n+0.25})$, $V_{2,3}(P_{n+0.5})$, and $V_{2,3}(P_{n+0.75})$, as the pixel values $V(P_{n+0.25})$, $V(P_{n+0.5})$, and $V(P_{n+0.75})$ on the quarter points $P_{n+0.25}$, $P_{n+0.5}$, and $P_{n+0.75}$, respectively.

Please note that, no matter whether the quarter points $P_{n+0.25}$, $P_{n+0.5}$, and/or $P_{n+0.75}$ are pixels within the high quality up-scaled image $I_{US}$, the controller can perform interpolation calculations according to the pixel values $V(P_n)$ and $V(P_{n+1})$ and according to two values corresponding to adjacent locations on the line within the values $V_{2,3}(P_{n+0.25})$, $V_{2,3}(P_{n+0.5})$, and $V_{2,3}(P_{n+0.75})$, in order to generate pixel values of pixels of other locations.

Figure 6:
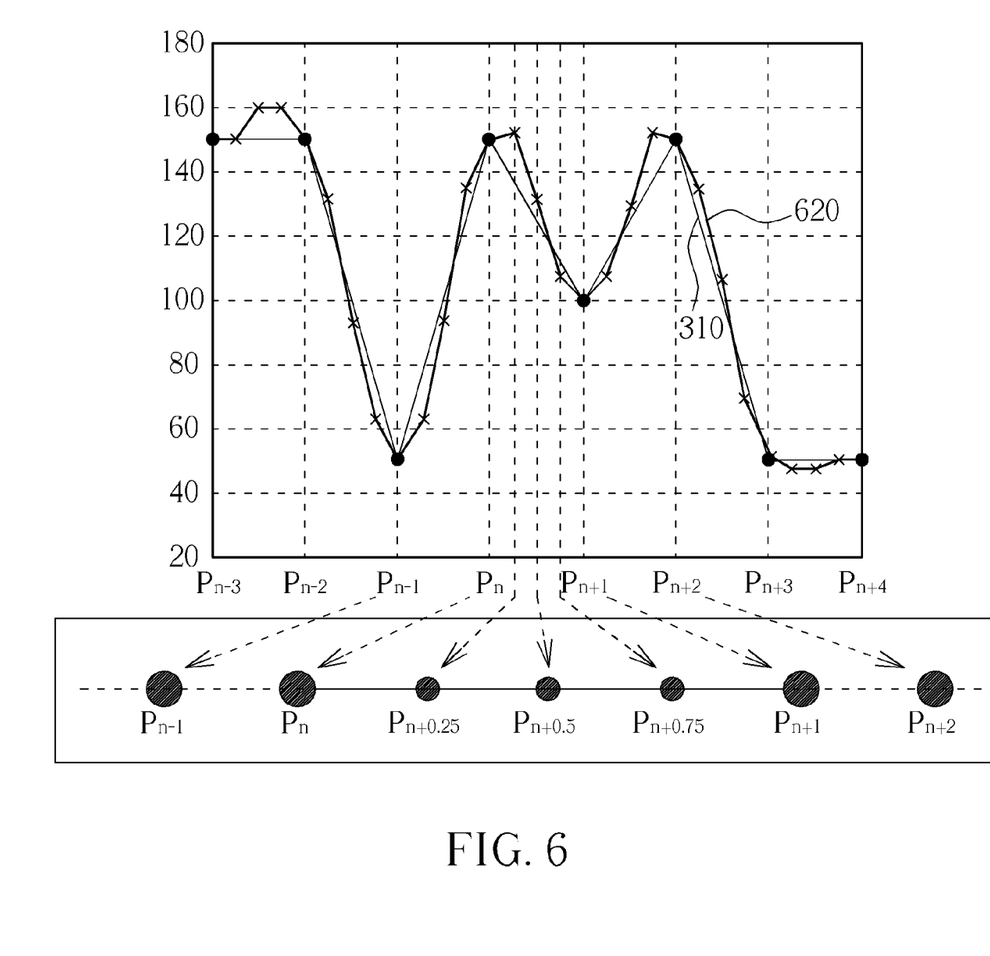

Referring to FIG. 6, the controller calculates the linear distribution values $V_1(P_{n+0.25})$, $V_1(P_{n+0.5})$, and $V_1(P_{n+0.75})$ according to the pixel values $V(P_n)$ and $V(P_{n+1})$, and adjusts the linear distribution values $V_1(P_{n+0.25})$, $V_1(P_{n+0.5})$, and $V_1(P_{n+0.75})$ according to at least three pixel values of the pixel values $V(P_{n-1})$, $V(P_n)$, $V(P_{n+1})$, and $V(P_{n+2})$ to generate the values respectively corresponding to the quarter points $P_{n+0.25}$, $P_{n+0.5}$, and $P_{n+0.75}$ on the curve 620, such as the values $V_{2,4}(P_{n+0.25})$, $V_{2,4}(P_{n+0.5})$, and $V_{2,4}(P_{n+0.75})$, and generates at least one pixel within the high quality up-scaled image $I_{US}$ accordingly. In this embodiment, the adjustment amounts utilized during adjusting the linear distribution values $V_1(P_{n+0.25})$, $V_1(P_{n+0.5})$, and $V_1(P_{n+0.75})$, respectively, such as the adjustment amounts $D_{2,4}(P_{n+0.25})$, $D_{2,4}(P_{n+0.5})$, and $D_{2,4}(P_{n+0.75})$, can be expressed as follows:

$$D_{2,4}(P_{n+0.25})=V_{2,4}(P_{n+0.25})-V_1(P_{n+0.25});$$

$$D_{2,4}(P_{n+0.5})=V_{2,4}(P_{n+0.5})-V_1(P_{n+0.5}); \text{ and}$$

$$D_{2,4}(P_{n+0.75})=V_{2,4}(P_{n+0.75})-V_1(P_{n+0.75}).$$

According to this embodiment, the aforementioned at least one predetermined range comprises a plurality of predetermined ranges $R_4(0)$, $R_4(1)$, $R_4(2)$, and $R_4(3)$ (e.g. which respectively represent the intervals [0, 63], [64, 127], [128, 191], and [192, 255] in this embodiment), and the aforementioned at least one weighting parameter comprises a plurality of weighting parameters $W_4(0)$, $W_4(1)$, $W_4(2)$, and $W_4(3)$ respectively corresponding to the predetermined ranges $R_4(0)$, $R_4(1)$, $R_4(2)$, and $R_4(3)$. In addition, the aforementioned at least one corresponding expected adjustment amount comprises a plurality of corresponding expected adjustment amounts such as the adjustment amounts $D_{2,1}(P_{n+0.25})$, $D_{2,1}(P_{n+0.5})$, and $D_{2,1}(P_{n+0.75})$ of the embodiment shown in FIG. 3, and the aforementioned at least one expected adjustment result comprises a plurality of expected adjustment results such as the values $V_{2,1}(P_{n+0.25})$, $V_{2,1}(P_{n+0.5})$, and $V_{2,1}(P_{n+0.75})$, where the aforementioned at least one adjustment amount comprises the three adjustment amounts $D_{2,4}(P_{n+0.25})$, $D_{2,4}(P_{n+0.5})$, and $D_{2,4}(P_{n+0.75})$ listed above. In this embodiment, according to whether a specific expected adjustment result of the expected adjustment results, such as the value $V_{2,1}(P_{n+X})$ (X=0.25, 0.5, or 0.75), falls within a specific predetermined range $R_4(Y)$ (Y=0, 1, 2, or 3), the controller 110 executing the program code 110C determines whether to apply a specific weighting parameter $W_4(Y)$ to a specific expected adjustment amount $D_{2,1}(P_{n+X})$ to generate a specific adjustment amount $D_{2,4}(P_{n+X})$ corresponding to the specific expected adjustment amount $D_{2,1}(P_{n+X})$, where the specific weighting parameter $W_4(Y)$ corresponds to the specific predetermined range $R_4(Y)$, and the specific expected adjustment result (e.g. the value $V_{2,1}(P_{n+X})$) corresponds to the specific expected adjustment amount $D_{2,1}(P_{n+X})$. More particularly, in a situation where the specific expected adjustment result such as the value $V_{2,1}(P_{n+X})$ falls within the specific predetermined range $R_4(Y)$, the controller 110 executing the program code 110C applies the specific weighting parameter $W_4(Y)$ to the specific expected adjustment amount $D_{2,1}(P_{n+X})$ to generate the specific adjustment amount $D_{2,4}(P_{n+X})$.

For example, FIG. 6 illustrates a situation where $W_4(0)=0.25$, $W_4(1)=0.5$, and $W_4(2)=0.75$, and in this embodiment, $W_4(3)=1$.

According to a special case of this embodiment, the controller can utilize the adjustment results illustrated by the curve 620, such as the values $V_{2,4}(P_{n+0.25})$, $V_{2,4}(P_{n+0.5})$, and $V_{2,4}(P_{n+0.75})$, as the pixel values $V(P_{n+0.25})$, $V(P_{n+0.5})$, and $V(P_{n+0.75})$ on the quarter points $P_{n+0.25}$, $P_{n+0.5}$, and $P_{n+0.75}$, respectively.

Please note that, no matter whether the quarter points $P_{n+0.25}$, $P_{n+0.5}$, and/or $P_{n+0.75}$ are pixel within the high quality up-scaled image $I_{US}$, the controller can perform interpolation calculations according to the pixel values $V(P_n)$ and $V(P_{n+1})$ and according to two values corresponding to adjacent locations on the line within the values $V_{2,4}(P_{n+0.25})$, $V_{2,4}(P_{n+0.5})$, and $V_{2,4}(P_{n+0.75})$, in order to generate pixel values of pixels of other locations.

It is an advantage of the present invention that, based upon the architecture disclosed in any of the respective embodiments/variations, the present invention method and device can solve the related art problem without introducing side effects. In contrast to the related art, when generating the high quality up-scaled image, the present invention method and device can achieve the goal of giving consideration to both the image quality and the calculation speed.

Those skilled in the art will readily observe that numerous modifications and alterations of the device and method may be made while retaining the teachings of the invention.

What is claimed is:

1. A method for generating a high quality up-scaled image, the method comprising:

utilizing at least four pixels within a source image as a plurality of reference pixels within the high quality up-scaled image, wherein the reference pixels are utilized as a portion of pixels within the high quality up-scaled image, and are utilized as reference for generating another portion of pixels within the high quality up-scaled image; and calculating at least one portion of three linear distribution values corresponding to three quarter points between two adjacent reference pixels according to pixel values of the two adjacent reference pixels and adjusting the portion of the linear distribution values according to pixel values of at least three reference pixels of the plurality of reference pixels, and using the adjusted portion of the linear distribution values to generate at least one pixel corresponding to the adjusted portion within the high quality up-scaled image, comprising:

utilizing the adjusted linear distribution value of the portion of the linear distribution values as the pixel value of the at least one pixel.

2. The method of claim 1, wherein the four pixels are arranged on a same line.

3. The method of claim 1, wherein adjusting the portion of the linear distribution values according to the pixel values of the at least three reference pixels of the plurality of reference pixels further comprises:

utilizing linear combinations of the pixel values of the at least three reference pixels as adjustment amounts utilized during adjusting the portion of the linear distribution values, respectively.

4. The method of claim 1, wherein the linear distribution values are bilinear values based upon the pixel values of the two adjacent pixels.

5. The method of claim 1, wherein the portion of the linear distribution values comprises all of the linear distribution values; and generating the at least one pixel within the high quality up-scaled image accordingly further comprises:

utilizing adjusted linear distribution values of all of the linear distribution values as pixel values of corresponding pixels within the high quality up-scaled image.

6. The method of claim 1, wherein generating the at least one pixel within the high quality up-scaled image accordingly further comprises:

performing at least one interpolation calculation according to adjusted linear distribution value(s) of the portion of the linear distribution values, in order to generate at least one pixel value of the at least one pixel.

7. The method of claim 1, further comprising:

applying a weighting parameter to at least one expected adjustment amount to generate at least one adjustment amount utilized during adjusting the portion of the linear distribution values.

8. The method of claim 1, further comprising:

according to whether at least one expected adjustment result that is obtained from adjusting the portion of the linear distribution values by at least one corresponding expected adjustment amount falls within at least one predetermined range, determining whether to apply at least one weighting parameter to the at least one corresponding expected adjustment amount to generate at least one adjustment amount utilized during adjusting the portion of the linear distribution values; and in a situation where the at least one expected adjustment result falls within the at least one predetermined range, applying the at least one weighting parameter to the at least one corresponding expected adjustment amount to generate the at least one adjustment amount.

9. The method of claim 8, wherein the at least one predetermined range comprises a plurality of predetermined ranges, and the at least one weighting parameter comprises a plurality of weighting parameters respectively corresponding to the predetermined ranges; the at least one corresponding expected adjustment amount comprises a plurality of corresponding expected adjustment amounts, and the at least one expected adjustment result comprises a plurality of expected adjustment results, and the at least one adjustment amount comprises a plurality of adjustment amounts; and the method further comprises:

according to whether a specific expected adjustment result of the expected adjustment results falls within a specific predetermined range of the predetermined ranges, determining whether to apply a specific weighting parameter of the weighting parameters to a specific expected adjustment amount of the corresponding expected adjustment amounts to generate a specific adjustment amount corresponding to the specific expected adjustment amount within the adjustment amounts, wherein the specific weighting parameter corresponds to the specific predetermined range, and the specific expected adjustment result corresponds to the specific expected adjustment amount; and in a situation where the specific expected adjustment result falls within the specific predetermined range, applying the specific weighting parameter to the specific expected adjustment amount to generate the specific adjustment amount.

10. A device for generating a high quality up-scaled image, the device comprising:

a controller arranged to execute a program code to control operations of the device; and a read only memory (ROM) positioned within/outside the controller, wherein the ROM is arranged to store the program code;

wherein the controller executing the program code utilizes at least four pixels within a source image as a plurality of reference pixels within the high quality up-scaled image, wherein the reference pixels are utilized as a portion of pixels within the high quality up-scaled image, and are utilized as reference for generating another portion of pixels within the high quality up-scaled image; and the controller executing the program code calculates at least one portion of three linear distribution values corresponding to three quarter points between two adjacent reference pixels according to pixel values of the two adjacent reference pixels and adjusts the portion of the linear distribution values according to pixel values of at least three reference pixels of the plurality of reference pixels, and uses the adjusted portion of the linear distribution values to generate at least one pixel corresponding to the adjusted portion within the high quality up-scaled image, and further utilizes the adjusted linear distribution value of the portion of the linear distribution values as the pixel value of the at least one pixel.

11. The device of claim 10, wherein the controller executing the program code utilizes linear combinations of the pixel values of the at least three reference pixels as adjustment amounts utilized during adjusting the portion of the linear distribution values, respectively.

12. The device of claim 10, wherein according to whether at least one expected adjustment result that is obtained from adjusting the portion of the linear distribution values by at least one corresponding expected adjustment amount falls within at least one predetermined range, the controller executing the program code determines whether to apply at least one weighting parameter to the at least one corresponding expected adjustment amount to generate at least one adjustment amount utilized during adjusting the portion of the linear distribution values; and in a situation where the at least one expected adjustment result falls within the at least one predetermined range, the controller executing the program code applies the at least one weighting parameter to the at least one corresponding expected adjustment amount to generate the at least one adjustment amount.

13. The device of claim 12, wherein the at least one predetermined range comprises a plurality of predetermined ranges, and the at least one weighting parameter comprises a plurality of weighting parameters respectively corresponding to the predetermined ranges; the at least one corresponding expected adjustment amount comprises a plurality of corresponding expected adjustment amounts, and the at least one expected adjustment result comprises a plurality of expected adjustment results, and the at least one adjustment amount comprises a plurality of adjustment amounts; and according to whether a specific expected adjustment result of the expected adjustment results falls within a specific predetermined range of the predetermined ranges, the controller executing the program code determines whether to apply a specific weighting parameter of the weighting parameters to a specific expected adjustment amount of the corresponding expected adjustment amounts to generate a specific adjustment amount corresponding to the specific expected adjustment amount within the adjustment amounts, wherein the specific weighting parameter corresponds to the specific predetermined range, and the specific expected adjustment result corresponds to the specific expected adjustment amount; and in a situation where the specific expected adjustment result falls within the specific predetermined range, the controller executing the program code applies the specific weighting parameter to the specific expected adjustment amount to generate the specific adjustment amount.

* * * * *